US009819937B1

(12) United States Patent
Helter et al.

(10) Patent No.: US 9,819,937 B1
(45) Date of Patent: Nov. 14, 2017

(54) RESOURCE-AWARE DESKTOP IMAGE DECIMATION METHOD AND APPARATUS

(71) Applicant: Teradici Corporation, Burnaby (CA)

(72) Inventors: Paul Andrew Helter, Port Moody (CA); Joseph Michel Kenneth Savage, Vancouver (CA)

(73) Assignee: Teradici Corporation, Burnaby, British Columbia (CA)

( * ) Notice: Subject to any disclaimer, the term of this patent is extended or adjusted under 35 U.S.C. 154(b) by 303 days.

(21) Appl. No.: 14/686,320

(22) Filed: Apr. 14, 2015

(51) Int. Cl.
*H04N 19/156* (2014.01)
*H04N 19/119* (2014.01)
*H04N 19/124* (2014.01)
*H04N 19/162* (2014.01)
*H04N 19/167* (2014.01)
*H04N 19/17* (2014.01)
*H04N 19/146* (2014.01)
*H04N 19/154* (2014.01)
*H04N 19/59* (2014.01)
*H04L 29/08* (2006.01)
*H04N 19/426* (2014.01)
(Continued)

(52) U.S. Cl.
CPC ........... *H04N 19/119* (2014.11); *H04L 67/10* (2013.01); *H04L 67/2828* (2013.01); *H04N 19/124* (2014.11); *H04N 19/146* (2014.11); *H04N 19/154* (2014.11); *H04N 19/156* (2014.11); *H04N 19/162* (2014.11); *H04N 19/167* (2014.11); *H04N 19/169* (2014.11); *H04N 19/17* (2014.11); *H04N 19/428* (2014.11); *H04N 19/587* (2014.11); *H04N 19/59* (2014.11)

(58) Field of Classification Search
CPC .... H04N 19/17; H04N 19/169; H04N 19/428; H04N 19/587; H04N 19/59; H04N 19/156; H04L 67/10; H04L 67/2828; G06F 9/4445
See application file for complete search history.

(56) References Cited

U.S. PATENT DOCUMENTS

| 4,670,773 A | * | 6/1987 | Silverberg | ........... H04N 11/006 |
| | | | | 348/427.1 |
| 5,237,413 A | * | 8/1993 | Israelsen | ................ H04N 5/144 |
| | | | | 348/384.1 |

(Continued)

OTHER PUBLICATIONS

Wu et al., "Low Bit-Rate Image Compression via Adaptive Down-Sampling and Constrained Least Squares Upconversion", IEEE Transactions on Image Processing, vol. 18, Issue 3, pp. 552-561, Mar. 2009.

(Continued)

*Primary Examiner* — Robert Hance
(74) *Attorney, Agent, or Firm* — Moser Taboada

(57) ABSTRACT

A method and apparatus for transmitting a desktop display comprising classifying a first region of the desktop display as persistently changed and a second region of the desktop display as sporadically changed, adjusting, in relation to a user experience (UX) bias and a resource constraint, a target image quality for the first region, decimating the first region in accordance with a spatial decimation factor to generate a first decimated region, compressing the first decimated region at the target image quality and compressing the second region to generate a plurality of compressed regions and transmitting the plurality of compressed regions to a client via an IP network.

20 Claims, 11 Drawing Sheets

(51) Int. Cl.
*H04N 19/169* (2014.01)
*H04N 19/587* (2014.01)

(56) References Cited

U.S. PATENT DOCUMENTS

| | | | | |
|---|---|---|---|---|
| 5,305,115 A * | 4/1994 | Takahashi | H04N 19/176 | 348/390.1 |
| 5,973,740 A * | 10/1999 | Hrusecky | H04N 5/4401 | 348/E11.021 |
| 7,965,775 B2 | 6/2011 | Morley et al. | | |
| 8,804,508 B1 * | 8/2014 | Hobbs | H04N 21/2402 | 370/230 |
| 2003/0093568 A1 * | 5/2003 | Deshpande | G06F 3/1462 | 709/247 |
| 2005/0033806 A1 * | 2/2005 | Harvey | H04L 12/1813 | 709/204 |
| 2005/0128307 A1 * | 6/2005 | Kobayashi | G06T 3/4023 | 348/208.1 |
| 2005/0226526 A1 * | 10/2005 | Mitsunaga | H04N 1/3935 | 382/274 |
| 2006/0072837 A1 * | 4/2006 | Ralston | H04N 19/176 | 382/232 |
| 2006/0274075 A1 * | 12/2006 | Yamazaki | H04N 19/176 | 345/543 |
| 2007/0282951 A1 * | 12/2007 | Selimis | H04L 67/06 | 709/205 |
| 2011/0115800 A1 * | 5/2011 | Desai | H04L 69/04 | 345/501 |

OTHER PUBLICATIONS

Wang et al., "Adaptive Down-Sampling Video Coding", Multimedia on Mobile Devices 2010, Proc. of SPIE-IS&T Electronic Imaging, vol. 7542, 8 Pages, Jan. 28, 2010.

Zinner et al., "Impact of Frame Rate and Resolution on Objective QoE Metrics", Second International Workshop on Quality of Multimedia Experience, pp. 29-34, Jun. 21-23, 2010.

Zhang et al., "Low Bit-Rate Image Coding Via Interpolation Oriented Adaptive Down-Sampling", Visual Communications and Image Processing 2010, SPIE, vol. 77441, 8 Pages, Aug. 4, 2010.

Dong et al., "Adaptive Downsampling for High-Definition Video Coding", IEEE Transactions on Circuits and Systems for Video Technology, vol. 24, Issue 3, pp. 480-488, Mar. 2014.

* cited by examiner

FIG. 9
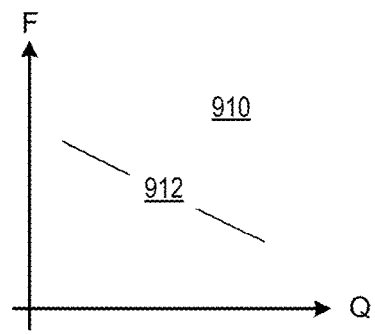
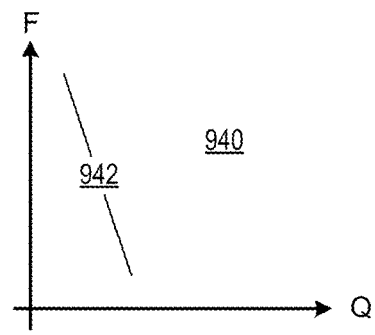
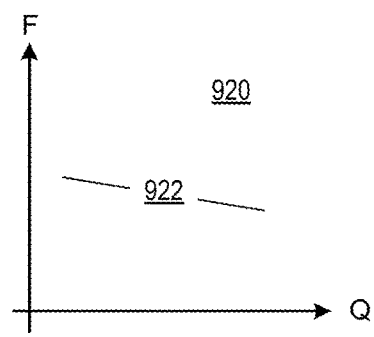
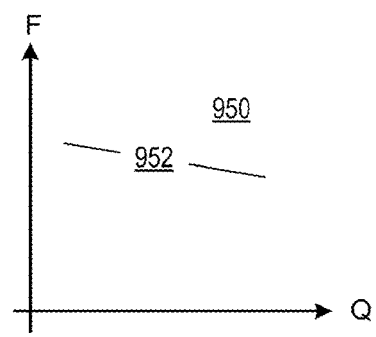
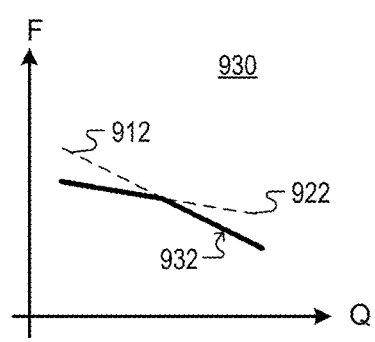
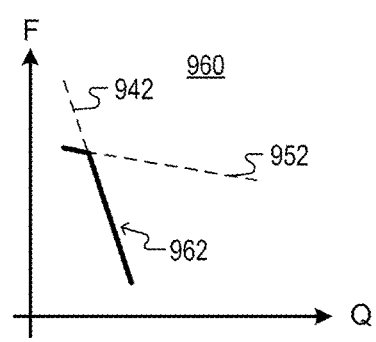

RESOURCE-AWARE DESKTOP IMAGE DECIMATION METHOD AND APPARATUS

BACKGROUND OF THE INVENTION

Field of the Invention

Embodiments of the present invention relate generally to a method and apparatus for resource-aware desktop image decimation.

Description of the Related Art

Traditional techniques for encoding computer desktop display images for remote computing environments comprise decomposing the image at an object level or a pixel level to separate high detail content such as text and icons before subjecting remaining areas of high color diversity to transform domain lossy compression such as Discrete Fourier Transform (DCT) or wavelet encoding. A major problem with such compression techniques is the limited dynamic range offered by any particular set of quantization tables. When using such traditional methods, user experience becomes compromised in low bandwidth remote computing scenarios or cases when the host computer is accessed from a client computer with limited computing resources. In such cases, high image quality is both desirable and attainable for static images or sporadically changing content but very high compression may be desired for rapidly changing content regions such as video windows where users generally favor a higher frame rate at poor image quality over a high quality image sequence delivered at a poor frame rate. Therefore, there is a need in the art for a method and apparatus for improving the dynamic compression range of image content associated with encoded computer desktop display images.

SUMMARY OF THE INVENTION

Embodiments of the present invention generally relate to a method for transmitting a desktop display. The method comprises classifying a first region of the desktop display as persistently changed and a second region of the desktop display as sporadically changed, adjusting, in relation to a user experience (UX) bias and a resource constraint, a target image quality for the first region, decimating the first region in accordance with a spatial decimation factor to generate a first decimated region, compressing the first decimated region at the target image quality and compressing the second region to generate a plurality of compressed regions; and transmitting the plurality of compressed regions to a client via an IP network.

Further embodiments of the present invention relate to an apparatus for transmitting a desktop display. The apparatus comprises a host processor that executes a resource aware encoder, the resource aware encoder implementing a method comprising classifying a first region of the desktop display as persistently changed and a second region of the desktop display as sporadically changed, adjusting, in relation to a user experience (UX) bias and a resource constraint, a target image quality for the first region, decimating the first region in accordance with a spatial decimation factor to generate a first decimated region and compressing the first decimated region at the target image quality and compressing the second region to generate a plurality of compressed regions, wherein the host processor transmits the plurality of compressed regions to a client via an IP network.

BRIEF DESCRIPTION OF THE DRAWINGS

So that the manner in which the above recited features of the present invention can be understood in detail, a more particular description of the invention, briefly summarized above, may be had by reference to embodiments, some of which are illustrated in the appended drawings. It is to be noted, however, that the appended drawings illustrate only typical embodiments of this invention and are therefore not to be considered limiting of its scope, for the invention may admit to other equally effective embodiments.

FIG. 9 illustrates a set of steps used to compile an aggregated non-decimating target profile and an aggregated decimating target profile;

DETAILED DESCRIPTION

The invention may be implemented in numerous ways, including as a process, an article of manufacture, an apparatus, a system, and as a set of computer-readable descriptions and/or instructions embedded on and/or in a computer-readable medium such as a computer-readable storage medium. In this specification, these implementations, or any other form that the invention may take, may be referred to as techniques. The Detailed Description provides an exposition of one or more embodiments of the invention that enable improvements in features such as performance, power utilization, cost, scalability, efficiency, and utility of use in the field identified above. The Detailed Description includes an Introduction to facilitate the more rapid understanding of the remainder of the Detailed Description. The invention encompasses all possible modifications and variations within the scope of the issued claims.

The term processor as used herein refers to any type of processor, central processing unit (CPU), microprocessor, microcontroller, embedded processor, media processor, graphics processor, or any other programmable device capable of executing and/or interpreting instructions in a form of software (such as microcode, firmware and/or programs).

The term software as used herein refers to any type of computer-executable instructions for any type of processor, such as programs, applications, scripts, drivers, operating systems, firmware, and microcode. Computer-executable instructions include any types of instructions performed by a processor, such as binary instructions that are directly performed, instructions that are translated and/or decoded prior to being performed, and instructions that are interpreted.

Introduction

Figure 1:
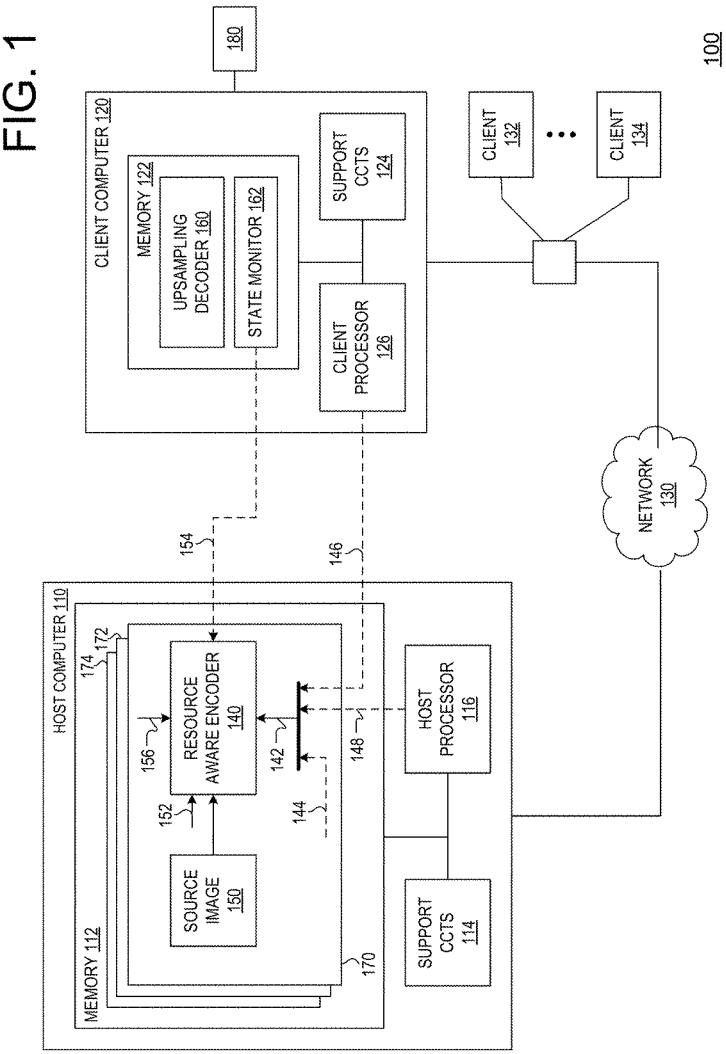
FIG. 1 illustrates selected details of an embodiment of a system comprising a host computer with resource-aware encoder connected to, and enabled to communicate with, a client computer.

In one or more embodiments of the present invention, a remote computing system, such as system 100 in FIG. 1, comprises a host computer coupled via a network to a client computer with a display. Software applications on the host computer, in conjunction with an operating system produce a sequence of mixed content image updates (i.e., an image sequence comprising content such as background, text, natural images and high detail objects) rendered as pixel values to a frame buffer in system memory. Some of the content (including natural images and high detail objects) may be associated with a video player application and changes at a periodic source frame rate (e.g., 24 frames per second). Other content may change sporadically or persistently in response to user input, for example a photo viewer or word processing document under control of scroll bars or a dragged application frame. Rather than, or in addition to, displaying the image sequence locally at the host computer, the updates to the image sequence are processed by a resource-aware encoder at the host computer and transmitted to the client computer. The image quality value used to encode the updates is dynamically adjusted to manage the utilization of CPU, network and power consumption resources within target resource constraints. Such resource management is achieved in part by segmenting the range of image quality values into a first segment of high quality values associated with a non-decimated image encoding mode and one or more reduced quality segments associated with one or more decimated image encoding modes which use significantly less resources than the non-decimated mode. In some embodiments, the image quality is further adjusted to prioritize utilization of CPU or network resources in response to state information such as the window focus state of an image region or user-presence information received from the client computer.

FIG. 1 illustrates selected details of an embodiment of a remote computing system 100 ("system 100") for remote display of a computer image. System 100 comprises a host computer 110, such as a personal computer, a computer server, or the like, coupled to and enabled to communicate with one or more communication endpoints, such as client computer 120, by an Internet Protocol (IP) packet network 130. In a virtualized environment such as a virtualized desktop infrastructure (VDI) or desktop-as-a-service (DaaS) deployment, system 100 comprises many client computers such as client 132 and client 134 in communication with the host computer 110 via network 130.

Host computer 110 ("computer 110") is, generally, a computer or system of computers with an operating system 170 designated for running application software such as word processor, spreadsheet application, Computer Aided Design (CAD) software, digital photo viewer, video player software and the like, and generating a visual user interface, i.e., a source image 150 stored as an ephemeral set of pixel values in a two-dimensional memory buffer of memory 112.

The source image 150 may comprise a host rendered desktop display image or a host rendered published application display image which is updated in response to user input, application events or operating system events. According to the present invention, a consecutive series of such updates to source image 150 is referred to as an 'image sequence'. In VDI or DaaS embodiments, the memory 112 comprises a plurality of operating systems (e.g. operating systems 170, 172 and 174), each comprising a source image and resource aware encoder, each associated at connection time with a particular client computer. In a multi-session embodiment such as a Remote Desktop Session Host (RDSH) or published application environment, many users or applications share the resources of operating system 170, each user having a separate container space comprising at least one source image and at least one resource aware encoder. The computer 110 comprises the host processor 116 which, in various embodiments, comprises one or more central processing units (CPUs), one or more graphics processing units (GPUs), or a combination of CPU and GPU processing elements communicatively coupled to memory 112 by well-known support circuits 114 such as north bridge, south bridge, power supplies, data registers, network interface and the like that enable communications between the elements of computer 110 in addition to communications between host computer 110 and the network 130.

The resource aware encoder 140 ("encoder 140") executes the step 240 of method 200 described herein. In an embodiment, an image quality value (e.g., related to image peak signal-to-noise ratio [PSNR] compared to source image 150 or a Joint Photographic Experts Group [JPEG] equivalent quality factor) is selected based on parameters including resource utilization targets 142 ("resource targets 142"), source image update interval 152 ("source interval 152"), client state information 154 and host state information 156. The resource targets 142 comprise: i) a network bandwidth target 144 associated with the available bandwidth and latency for the remote computing connection between operating system 170 and the client 120, ii) a client and host resources 146 (e.g., expressed directly as a pixel processing limit for the decoder 160 or indirectly as a well-known 'Experience Index' associated with the computational capability of client processor 126 and iii) a host resource 148, also expressed directly as a pixel processing limit for the encoder 140 or indirectly as an experience index associated with the computational capability of host processor 116. The client and host resources 146 and 148 may be static or dynamic in nature and indicative of short term computational loading. Furthermore, the client and host resources 146 and 148 may comprise static or dynamic memory utilization and power consumption targets. The host state information 156 indicates to encoder 140 which visual region is in focus such that user experience ("UX", i.e. the image quality and image update interval) for a select portion of source image 150 is adjusted accordingly. According to the present specification, a region is defined as areas of a display image with like classification. As one example, a region may comprise a single application window with an identified property such as being in-focus. As another example, a region may comprise several discontinuous groups of pixels with a common property such as multiple separate areas of a display image all subject to persistent change. In some embodiments, the encoder 140 is implemented as a hardware accelerator function such as part of an application specific integrated circuit (ASIC) or field programmable gate array (FPGA) with access to the memory 112. Such a hardware accelerator may comprise memory resources, image classification and encoding functions in addition to stream assembly functions for encoding and transmitting source image 150 and other source images generated by the host processor 116. In other embodiments, the encoder 140 is implemented, at least in part, as a set of machine executable instructions stored in memory 112 and executed by the host processor 116.

The network 130 comprises a communication system (e.g., the Internet, local area network (LAN), wireless LAN, wide area network (WAN), and the like) that connects computer systems completely by wire, cable, fiber optic, and/or wireless links facilitated by various types of well-known network elements, such as hubs, switches, routers, and the like. In one embodiment, the network 130 may be a shared packet switched network that employs various well-known protocols (e.g., TCP/IP, UDP/IP and the like) to communicate information amongst the network resources. For example, in various embodiments, the network 130 employs part of the Internet.

The client computer 120 ("client 120") is generally any type of computing device that can connect to network 130 and execute the image decoding techniques described herein. For example, in an embodiment, client 120 is a terminal such as a zero client, thin client, personal computer, a digital signage device or tablet device. Client 120 typically comprises one or more peripheral devices such as a mouse, keyboard and display 180 for presenting a remote Graphical User Interface (GUI). In the embodiment of FIG. 1, client computer 120 comprises a client processor 126 and memory 122 coupled by well-known support circuits 124. The up-sampling image decoder 160 ('decoder 160') comprises image decoder functions such as lossless decompression and inverse quantization functions complementary to those of encoder 140. In some embodiments, the decoder 160 is implemented, at least in part, as a set of machine executable instructions stored in memory 122 and executed by client processor 126. In other embodiments, the decoder 160 is implemented at least in part as a hardware accelerator function such as part of an application specific integrated circuit (ASIC) or field programmable gate array (FPGA) with memory and a display interface.

The state monitor 162 comprises software services for determining and presenting client state information 154 to encoder 140. Examples of such client state information include application focus information (i.e. identification of the 'in-focus' application window) or presence information. In a multi-application embodiment in which the client 120 is enabled for simultaneous display of several application windows associated with different host computers (e.g. a first application window associated with source image 150 and a second application window associated with an application local to the client processor 126), client 120 comprises decoder and state monitor functions for each host computer and state information 154 indicates to encoder 140 whether or not source image 150 is the focus of client 120 and resource targets are adjusted accordingly. In another embodiment, state information 154 indicates to encoder 140 whether or not a user is present at client 120 using well known presence detection techniques. In another embodiment useful for digital signage applications, state information 154 indicates a distance between client 120 and a human observer which is used to bias image quality and conserve host CPU resources and/or client power consumption.

Figure 2:
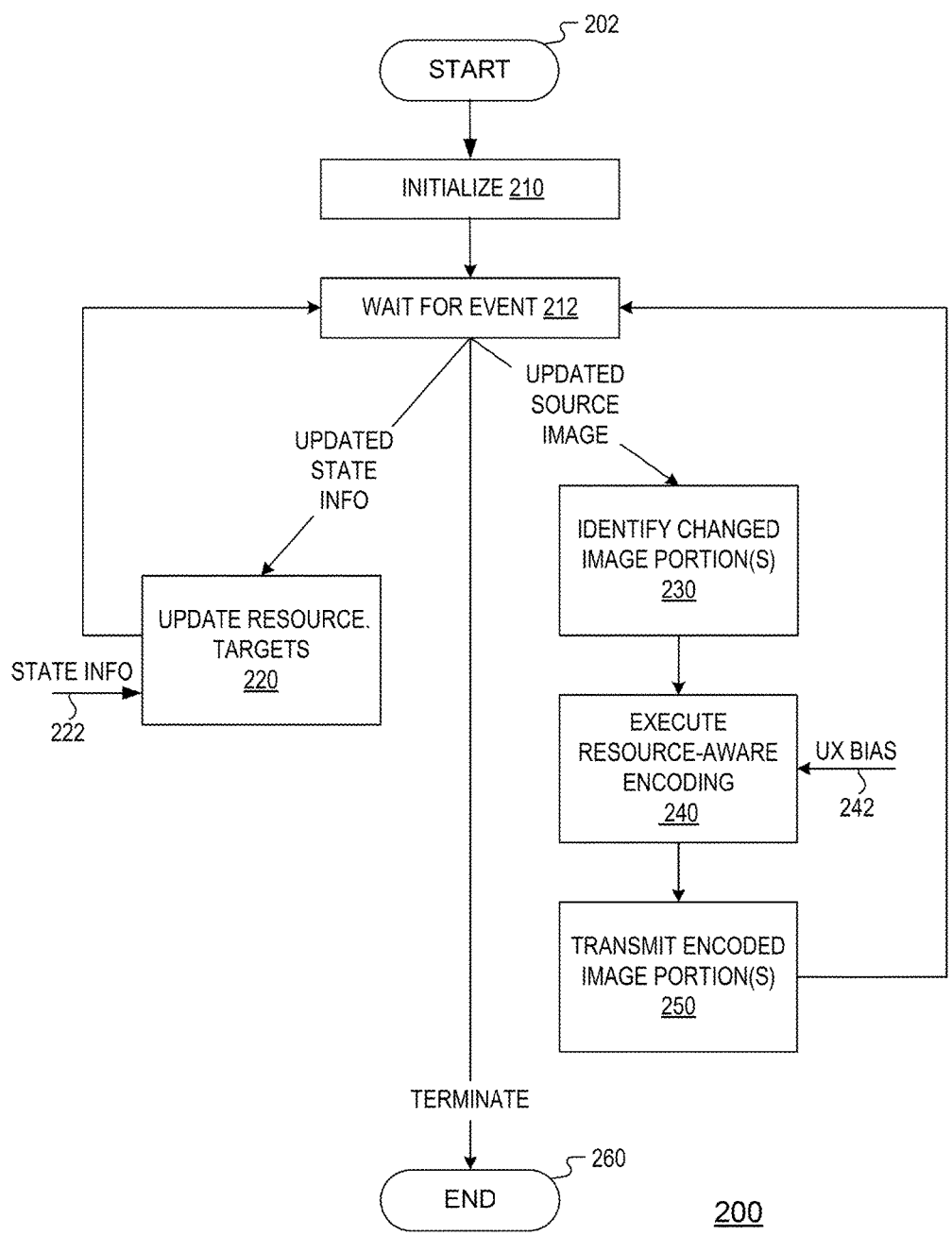
FIG. 2 illustrates an embodiment of a method executed by a host processor for encoding and transmitting a temporal sequence of updates of a source image in compliance with a set of resource targets.

FIG. 2 illustrates an embodiment of a method 200 executed by a host processor 116 for encoding and transmitting a temporal sequence of updates of a source image 150 in compliance with a set of resource targets 142.

Method 200 starts at step 202 and proceeds to step 210 ("Initialize") in which encoder 140 and decoder 160 are initialized, and capabilities of encoder 140 and decoder 160 are exchanged between the host computer 110 and the client 120. Such capabilities include direct physical resource limits (e.g. 100 Mbps network limitation imposed by an Ethernet interface at client 120) or indirect limits (e.g. CPU frequency limit, supported frame rate, number of cores or operational wattage specification) which are used to characterize the performance or battery life capabilities of a resource. A bandwidth estimation process 300 (described in association with FIG. 3) is spawned on the host computer 110 and non-decimating and decimating target profiles for the various resources of system 100 are initialized. Resource target profiles are generated for host resources, client resources and network resources. For example, in an embodiment, tables of resource target profiles are generated for each of i) the host CPU resource, ii) the network resource and iii) the client CPU resource. Each table comprises a series of target profiles associated with the particular resource. In some embodiments, target profiles for CPU host resources are calculated based on the cost of performing lossless encoding vs. decimation encoding vs. non-decimated transform encoding.

In the case of the host CPU resource, target profiles are loaded from memory or generated for at least one non-decimating mode of encoder 140 and at least one decimating mode of encoder 140 (e.g. a 4:1 decimation mode). If additional decimation modes are supported by encoder 140 (e.g. 16:1 decimation mode), corresponding tables of resource target profiles are loaded or generated. In some embodiments, host CPU target profiles are provided for both single threaded and multi-threaded execution modes of host processor 116 which enables throttling of user experience via single threading to preserve resources or single threaded execution modes in view or network or client resource limitations while also enabling high levels of user experience when resources are abundant or based on particular user requirements. In an embodiment, a table of host CPU resource target profiles provides a set of associations between target image quality i.e. 'target quality' values (e.g. as defined by quantization tables and levels) and corresponding minimum update intervals of encoder 140. Note that in the case of a periodically updated source image 150, the 'minimum update interval' translates directly to a 'maximum transmitted frame rate' as output from encoder 140 which might be limited by the native frame rate of source image 150 or limited to a desired frame rate by user preferences, policies or processing capabilities. The target quality value associations are repeated for each of a set of processing bandwidth limits (i.e. throughput limits) determined for the host processor 116. Such a processing bandwidth limit is usefully normalized in terms of millions-of-pixels-per-second ('MPPS') and in different embodiments, determined based on known benchmarks for encoder 140 in combination with published capabilities of host processor 116 (e.g. processor frequency, instruction set, number of cores, multi-threading features and the like). Normalized processing bandwidth values may be segmented according to encoding method (e.g. LY encoding, LL encoding and decimation encoding) to account for different CPU processing costs for different encoder types. This enables an image classification process to dynamically tune the ratio of pixels subjected to lossless encoding vs. decimation encoding vs. non-decimated transform encoding (e.g. according to image features) based on the segmented processing bandwidth limits. Alternatively, a processing bandwidth limit may be determined empirically by monitoring performance of host processor 116 in response to a predetermined image sequence and pixel rate provided as updates to source image 150.

In the case of the network resource, target profiles are also loaded from memory or generated for non-decimating and decimating modes. In an embodiment, a network resource table provides a set of associations between target quality values (e.g. as defined by quantization levels) of encoder 140 and corresponding minimum update intervals. These target quality value associations are repeated for each of a set of available network bandwidth limits (i.e. throughput limits) determined for the network 130. Such an available network bandwidth limit is usefully normalized as a ratio of the available network bandwidth divided by the number of changed pixels. The target quality value associations may be based on published relationships between quantization level and pixel compression ratio for the selected compression method and/or generated and updated based on utilization history metrics. Alternatively, the available network bandwidth limit may be determined empirically by monitoring the maximum throughput of network 130 in response to a transmission sequence at predetermined target quality values and pre-determined numbers of changed pixels.

Figure 7:
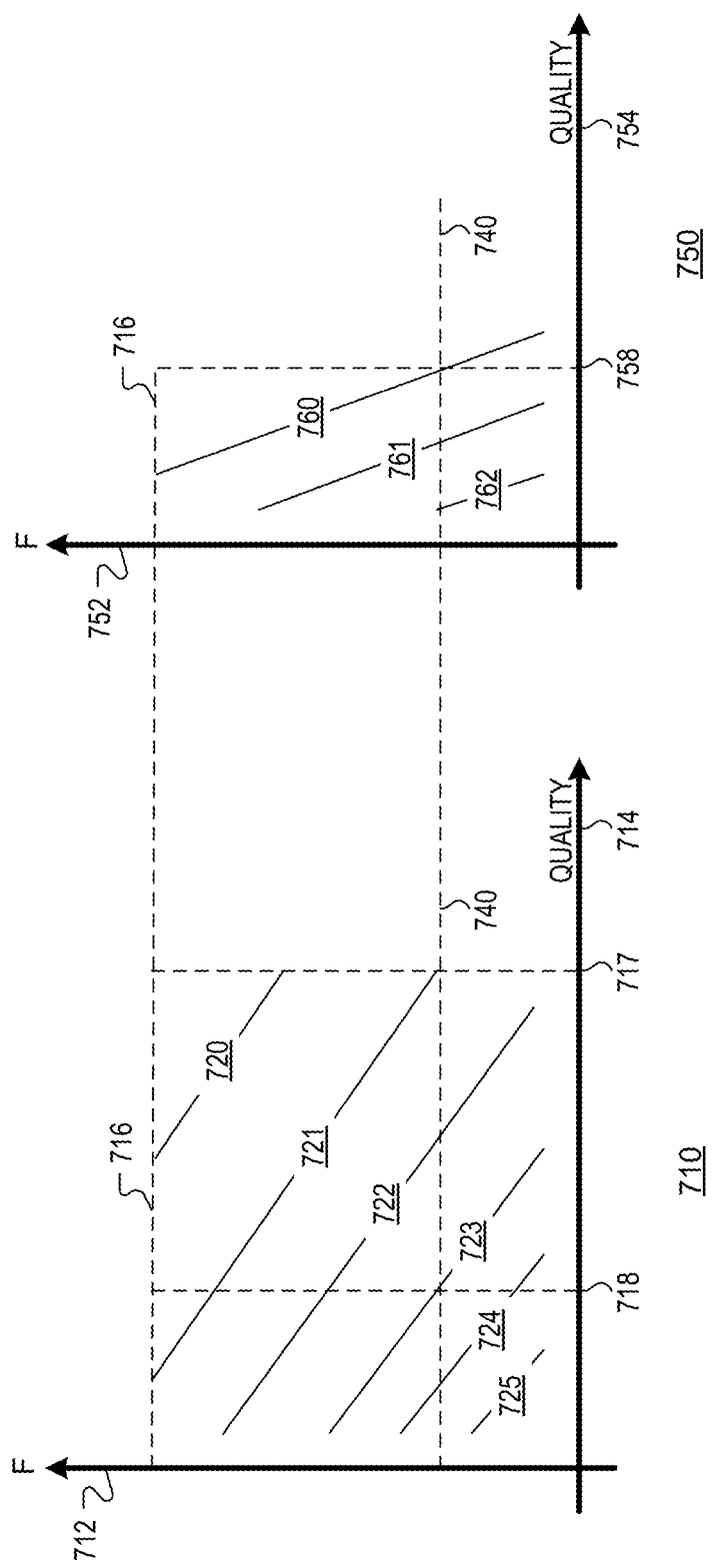
FIG. 7 illustrates a set of non-decimating network resource target profiles and a set of decimating network resource target profiles.
Figure 8:
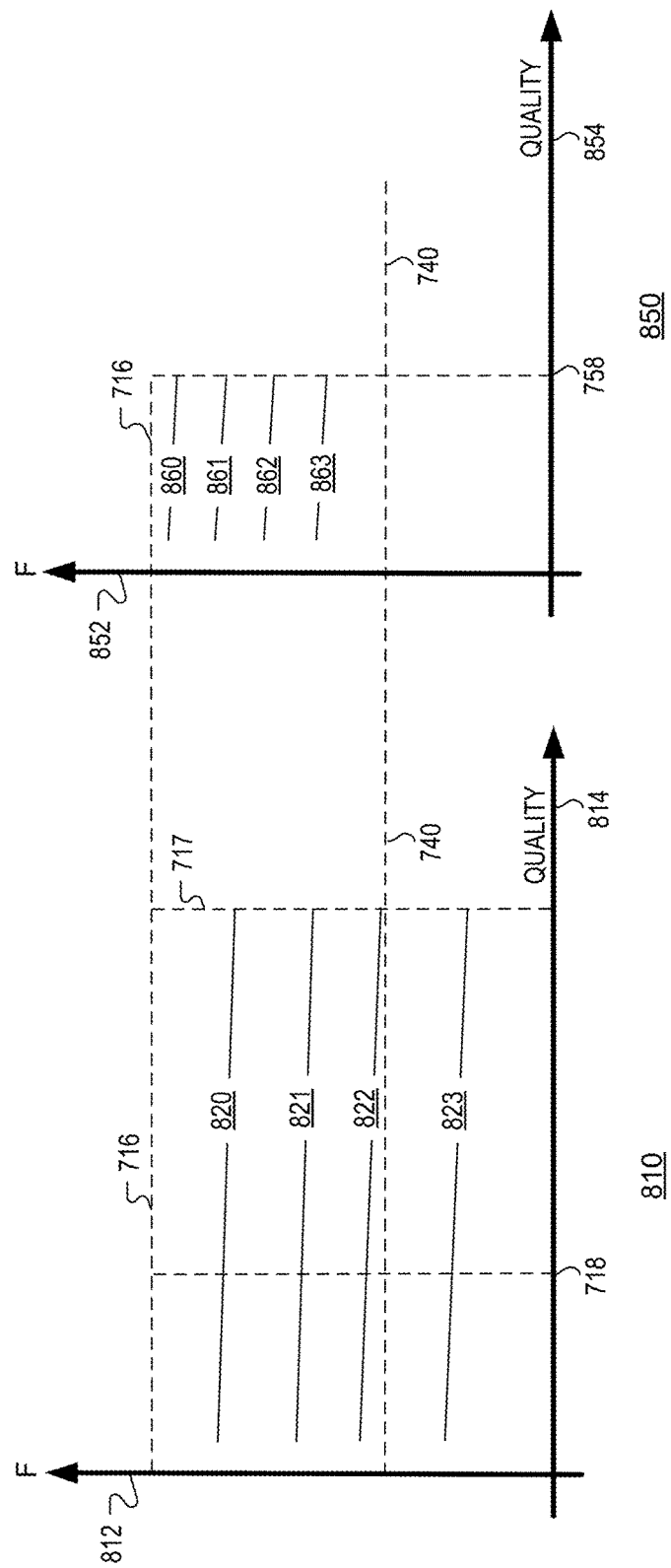
FIG. 8 illustrates a set of non-decimating CPU resource target profiles and a set of decimating CPU resource target profiles.

Similarly, in some embodiments, non-decimating and decimating target profiles pertaining to client CPU processing resources, GPU resources or client CPU power consumption, are generated. In an embodiment state monitor 162 provides battery level alerts to encoder 140 and power consumption target profiles are selected according to current battery level. In another embodiment, a user configures a desired battery drain profile via software executed either by client 120 or host computer 110 and power consumption target profiles are selected according. In other embodiments, target profiles are provided for memory 112 or memory 122 which limit the memory utilized by encoder 140 or decoder 160. FIG. 7 described later shows non-decimating and decimating series of target profiles for an exemplary network resource and FIG. 8 shows non-decimating and decimating series of target profiles for an exemplary host or client CPU resource.

Method 200 proceeds to step 212 ("Wait for Event") in which the method 200 responds to one of i) updated state information, ii) updated source image 150 or iii) a termination request. If updated state information (e.g. a changed source interval 152, changed client state information 154 or a changed resource targets 142) is received, method 200 proceeds to step 220 ("Update Resource Targets") in which resource targets 142 are updated based on state information 222. State information 222 comprises the latest network bandwidth estimate (ref. process 300) or current CPU load information for processor 126 (via client state information 154) or current CPU load information for processor 116 via host state information 156. In some embodiments, client state information 154 or host state information 156 provides window focus information and CPU or network target profiles are adjusted to throttle bandwidth or CPU consumption for changed image regions that are not the current 'in-focus' window of the host or client operating system.

If at step 212, an updated source image 150 is received (e.g. new changes to source image 150 are registered via a changed pixel mask), method 200 proceeds to step 230 ("Identify Changed Image Portion or Portions") where changes to the source image (i.e. changes to pixels, macroblocks or other defined regions) subsequent to a previous iteration of method 200 are marked using well known change detection means such as an image mask and change detection software service associated with the graphics sub-system of OSs 170.

At step 240 ("Execute Resource-Aware Encoding"), method 200 processes the source image 150, described in further detail as process 400. In an embodiment, step 240 may be skipped for select frames or updated regions and the timing of encoding of an updated source image determined by the greater time period of i) the time to encode and transmit the previous updated source image (i.e. previous iteration of step 240) ii) the minimum update interval identified to maintain the host CPU processing resource within a specified resource utilization target and iii) the minimum update interval identified to maintain the client CPU processing resource within a specified resource utilization target. If a User Experience (i.e. 'UX') bias parameter 242 is used for manual adjustment of user experience, the UX bias parameter is checked for an applied adjustment at step 240 and used in determining the target quality value at step 414 described later. In an embodiment, the UX bias parameter 242 is adjusted responsive to input (e.g., user input) received from the client computer 120. As an example of a UX bias adjustment, a UX preference in a continuum between desired high frame rate (i.e. smoothest video playback) at a reduced image quality and highest image quality at a reduced frame rate is adjusted by setting UX bias parameter 242.

At step 250 ("Transmit Encoded Image Portion or portions"), the image portions identified as changed at step 230 and encoded at step 240 are transmitted via the network 130 to the client. If at step 260, new changes to source image 150 are registered (for example via a changed pixel mask), the method 200 returns to step 230. If, at step 212 it is determined that method 200 should end for example following termination of a remote computing session, method 200 proceeds to step 260 where it ends.

Figure 3:
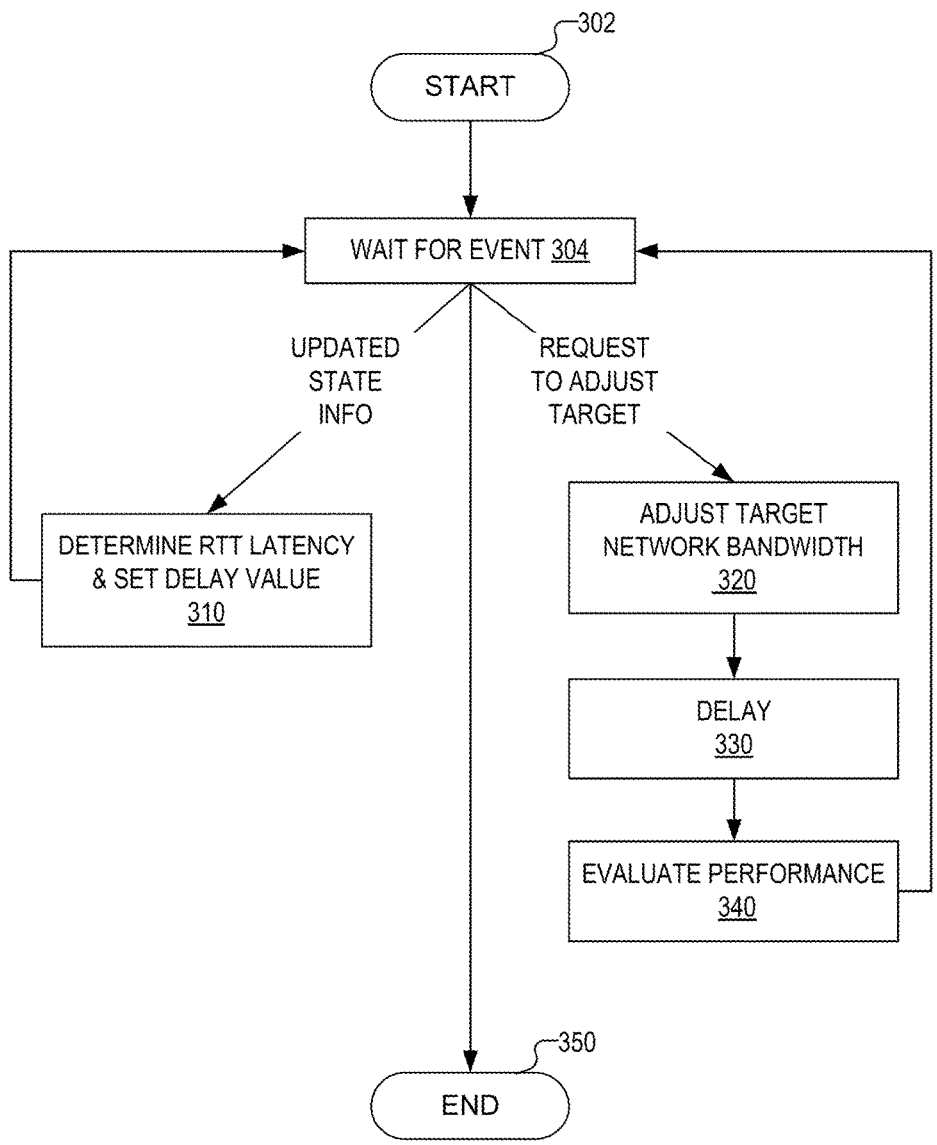
FIG. 3 illustrates a process executed by a host processor for repeatedly adjusting target network bandwidth on a UDP/IP network.

FIG. 3 illustrates an embodiment of a process 300 executed by a host processor 116 for repeatedly estimating available network bandwidth on a UDP/IP network 130. Process 300 executes concurrently with the encoding method 200.

Process 300 starts at step 302 and proceeds to step 304 ("Wait for Event") in which it responds to one of i) updated state information, ii) a target network bandwidth adjustment request (e.g. timer based) or iii) a termination request. If updated state information is received, process 300 proceeds to step 310 ("Determine Round Trip Time [RTT] Latency and set Delay Value"). At step 310, a software service of host processor 116 determines the RTT between computer 110 and the client 120, for example by monitoring the acknowledgement time related to a network packet transmitted to the client 120. A delay value is set based on the determined RTT and process 300 returns to step 304.

If, at step 304, a target network bandwidth adjustment request is received, the target network bandwidth is either set (e.g. on an initial pass of process 300) or updated (e.g. on subsequent passes of process 300). An initial value may be selected based on historic usage information or default target bandwidth settings. Adjustments are made in incremental steps, for example following well known bandwidth adjustment curves dependent on the performance measured at step 340.

Process 300 proceeds from step 320 to step 330 ("Delay") in which the delay value determined at step 310 is used to delay the evaluation of the impact of the adjustment made at step 320.

At step 340 ("Evaluate Performance"), process 300 measures the impact of the target network bandwidth adjustment at step 320. In an embodiment, packet loss metrics returned from the client 120 provide an indication of the present target network bandwidth (i.e. a high packet loss value indicates that the target network bandwidth should be decreased, a low packet loss value indicates that the target network bandwidth should remain steady and an absence of packet loss indicates that the target network bandwidth should be increased. Process 300 returns to step 304. If, at step 304, a termination request is received, the process 300 ends at step 350, for example following termination of a remote computing session.

Figure 4:
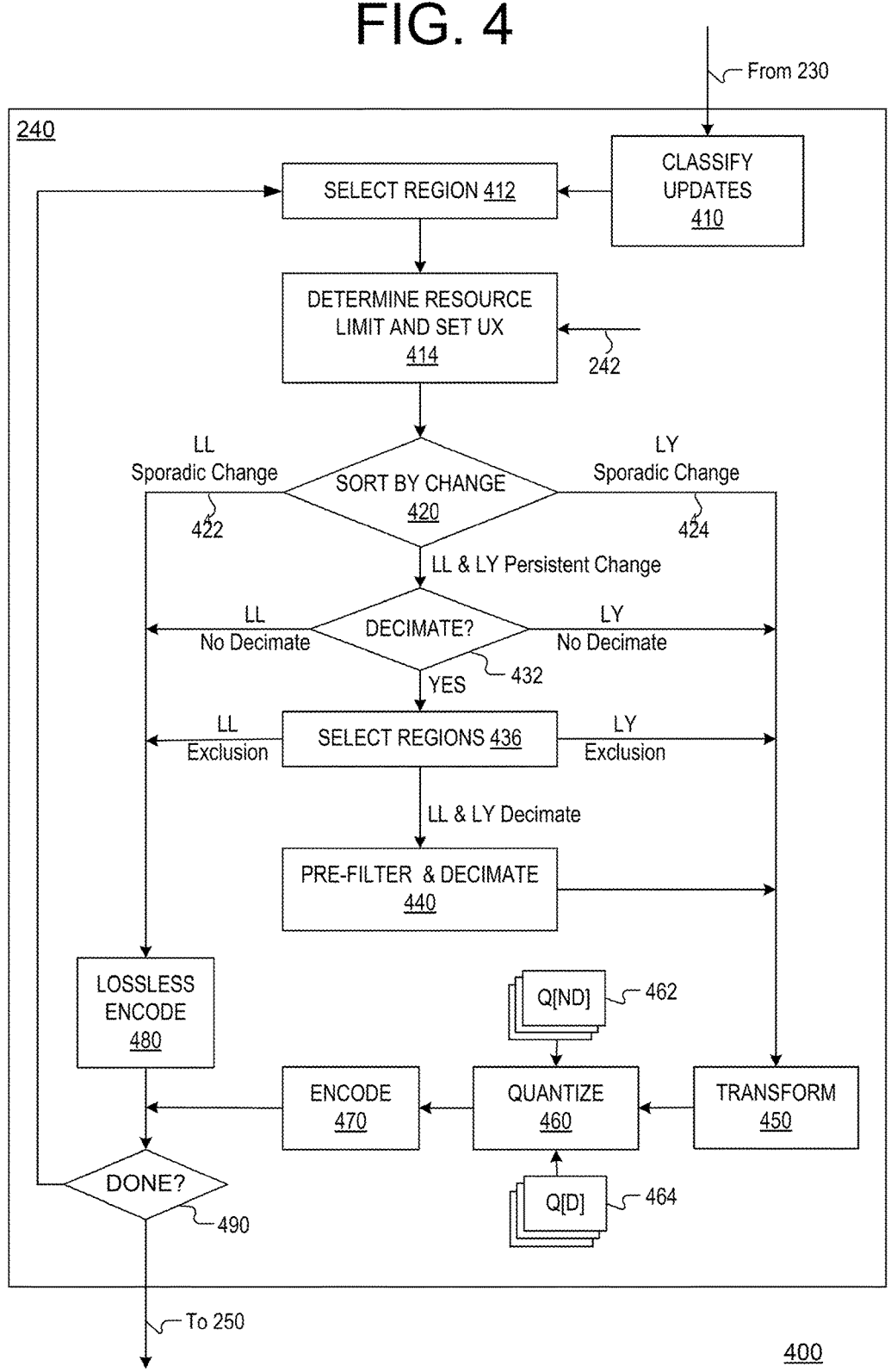
FIG. 4 illustrates a process for encoding updates to a source image.

FIG. 4 illustrates process 400 which is an embodiment of step 240 for encoding updates of a source image 150. Process 400 starts at step 410 ("Classify Updates") where each image update previously marked as changed at step 230 and further designated for encoder 140 is classified as either sporadic or persistent. In embodiments comprising image caching services or motion compensation, some updates to source image 150 are diverted for processing by alternative services in advance of step 410 but processing resource and network bandwidth requirements are adjusted in the determination of resource limits at step 414 below. In embodiments using progressive refinement techniques, processing resource and network bandwidth requirements are further adjusted for image update previously marked as changed at step 230 and also designated as sporadically changing at a previous iteration of step 420. An image portion (e.g. a pixel or a macroblock region) is detected as 'persistently changing' when one or more of the pixels in the region is detected to have repeatedly changed for a predetermined number of consecutive updates to source image 150 (e.g. 5 consecutive updates) or a specified number of updates over a given period (e.g. 8 of 10 previous updates) or a periodic source frame rate (e.g. 15 frames per second) over a constant size portion of source image 150 and constant location within source image 150. Such persistent change is indicative of periodic source content such as video content, window scrolling or window dragging. If a previously 'persistently changing' region is detected to have stopped changing for a specified number of frame intervals, generally including a hysteresis period (e.g. 20 unchanged frame intervals), the persistent region is reclassified as 'sporadically changing' i.e., there are extended periods during which the region is either unchanged or changes intermittently such as periods of desktop inactivity or periods of interaction with office productivity applications where the image is updated intermittently. In an embodiment, a sporadic image region comprises i) variable size of changed content, ii) variable location of changed content, iii) compressed data rate below a defined threshold or iv) number of source image updates below a defined threshold. Image content is further classified at step 410 as comprising content suitable for lossy encoding (e.g. natural image types with many distinct colors suited to quantization) designated as 'LY' content herein or content suitable for lossless encoding (e.g. text or high contrast icons with important visual details typically characterized by few distinct colors and suited to dictionary-based encoding) and designated as 'LL' content herein. One method for determining 'LL' pixels for a region comprises evaluating the ratio of pixels of a common color and a defined level of spatial contrast to within a region. If the ratio of common color pixels and contrast exceed a defined threshold, the region is classified as IL'. By adjusting the ratio and/or contrast level, marginal regions are reclassified from 'LL' to 'LY' and vice versa. In an embodiment, step 410 pre-processes all changed content for an updated source image 150 to classify changed regions as i) LY Sporadic, ii) LL Sporadic, iii) LY Persistent or iv) LL Persistent in addition to identifying the amount of data in each classified region such that a determination can be made regarding how to encode the aggregated regions within resource limits.

Process 400 proceeds to step 412 where the next changed region classified at step 410 is selected for encoding. Regions may be prioritized based on user focus, content type, or size of change or elapsed time since previously encoded. In embodiments using progressive refinement techniques, a previously changed region may be selected at step 410 and incremented to a higher quality value. According to one embodiment, the image region is selectively chosen from a sequence of frames of the desktop display to maintain a predetermined and specified CPU resource utilization target.

Process 400 proceeds to step 414 ("Determine Resource Limit and Set UX"). At step 414, a target quality value (with a corresponding update interval or frame rate) is selected for a region based on the resource targets 142. An embodiment of step 414 is described as process 500.

Process 400 proceeds to step 420 ("Sort by Change") where classified image updates in a region are processed according to their classification at step 410. In case 422, sporadically changing LL content is directed for lossless encoding at step 480. In case 424, sporadically changing LY content or previously changed content designated for progressive refinement is directed for lossy encoding via transform step 450. The remaining persistently changing LL and LY content are subjected to resource-aware encoding.

Process 400 proceeds to step 432 ("Decimate?") in which regions are designated for decimation or alternatively, conventional lossy or lossless encoding based on the target quality determined at step 414. If the target quality is above the decimation threshold (i.e. the quality value below which decimation is used), LL regions are designated for lossless encoding at step 480 and LY regions are designated for lossy encoding via step 450. If the image quality determined at step 414 is at or below the decimation threshold, process 400 proceeds to step 436 ("Select Regions") in which select regions from the persistently changing set are demarcated as being excluded from decimation to prevent the introduction of undesirable artifacts during decimation step 440. As one example, if a rectangular contiguous surface is detected as persistently changing, which is likely representative of video playback, an exclusion zone comprising the border image regions (e.g. border macroblocks) which usually comprise both persistently changing pixels on the video surface and also static pixels defining the border and menu regions of the video player are excluded from decimation and marked for conventional lossless or lossy encoding. In an embodiment, the target quality of excluded regions is set according to content type (e.g. Content comprising high contrast or few colors is set at a high target quality to preserve content detail.)

Process 400 proceeds to step 440 ("Pre-filter and Decimate") in which persistently changing LL and LY updated regions are decimated. In an embodiment, neighboring pixels are grouped as sets (e.g. 2×2 block sets or 4×4 block sets) dependent on the spatial decimation factor (e.g. decimation by a factor of two or decimation by a factor of four in each of x and y co-ordinates), each set is gamma corrected via means such as look-up tables or approximate integer polynomials and then decimated (e.g. 4:1 decimation by averaging the gamma corrected set or 16:1 decimation). The decimated pixels are then processed using lossy encoding via steps 450-470.

Steps 450-470 represent the compression steps. Process 400 proceeds to step 450 in which the updated blocks are transformed (e.g. wavelet or Discrete Cosine Transform [DCT]) and then quantized at step 460 using either non-decimating quantization tables 462 (in cases where the target quality value determined at step 414 falls within the non-decimating image quality range) or decimation quantization tables 464 (in cases where the target quality value determined at step 414 falls within the-decimating image quality range). In an embodiment, source image 150 is logically tiled to a common block size (e.g. 16×16 pixels) used for the transform step 450 in which case tile boundaries are observed at decimation step 440 to allow a mix of decimated and non-decimated regions. The quantized image regions are encoded at step 470 using for example, an arithmetic encoder (e.g. a content-adaptive binary arithmetic encoder [CABAC]). At step 480, LL Image updates are processed by a lossless encoder such as dictionary encoder or a high quality lossy encoder (e.g. an H.264 Hi444 encoder).

Process 400 proceeds to step 490 ("Done?") from where it returns to step 412 when additional regions need to be processed or exits once all regions are processed or, in some embodiments, once a new updated source image for the region is available to avoid encoding out-of-date updates.

Figure 5:
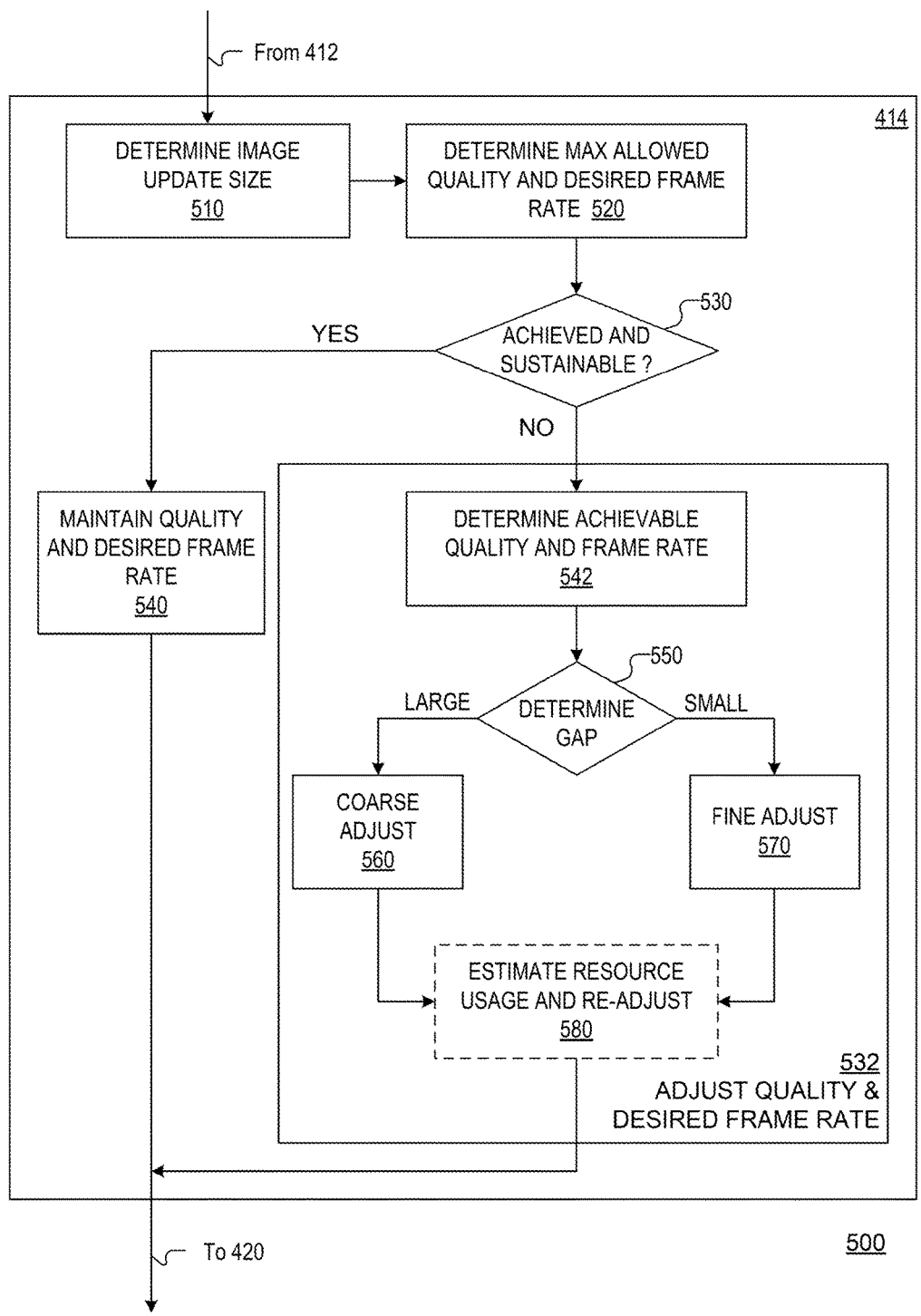
FIG. 5 illustrates a process for determining resource limits and setting user experience.

FIG. 5 is an illustration of a process 500, an embodiment of step 414 which sets the UX based on the size of the update and resource constraints. Process 500 starts at step 510 ("Determine Image Update Size") in which the number of persistently changing LL and LY pixels in the region selected at step 412 is determined. According to some embodiments, the resource constraint applied to the persistently changing LL and LY pixels is derived from the system-wide resource constraint which is adjusted for resource utilization requirements of regions associated with other updates classified at step 410. The resource constraint comprises at least i) a bandwidth constraint of the IP network, ii) a client processor utilization target and iii) a host processor utilization target. In one embodiment, the client processor utilization target is adjusted according to power consumption requirements of the client.

Process 500 proceeds to step 520 ("Determine Maximum Allowed Quality and Desired Frame Rate"). The maximum allowed quality comprises the highest quality value supported by encoder 140, optionally limited to a lesser value by policies or user preferences. The desired frame rate comprises the native frame rate associated with source image 150, as limited by the capabilities of host processor 116 and optionally, further limited by policies or user preferences.

Process 500 proceeds to step 530 ("Maintain Quality and Desired Frame Rate") where it is determined whether i) the existing target quality matches the maximum allowed quality ii) the existing target quality is sustainable in view of available bandwidth and update size determined at step 510 and iii) the desired frame rate is sustainable in view of available bandwidth and update size determined at step 510. If the desired frame rate is sustainable and the existing target quality is at the maximum allowed value and is further sustainable, process 500 proceeds to step 540 in which the existing target quality value and desired frame rate are maintained for quantization and encoding of the image update at steps 460 and 470 shown in FIG. 4. After step 540, process 500 returns to step 420 shown in FIG. 4.

If, at step 530 it is determined that either of the maximum allowed quality or desired frame rate are not achieved or not sustainable, process 500 proceeds to step 532 ("Adjust Quality and Desired Frame Rate"), which in one embodiment comprises the steps 542, 550, 560, 570 and 580. An alternative embodiment of step 532 is described by process 600.

At step 542 ("Determine Achievable Quality and Frame Rate"), the prospective encoding of the changed region selected at step 412 is evaluated for conformance with the available resources to determine an achievable quality and frame rate which is weighted by UX bias parameter 242. In an embodiment, the prospective encoding of the changed region is evaluated for compliance with the target network bandwidth and at least one of i) a host CPU processing target, ii) a client CPU processing target iii) a client CPU power consumption target and iv) a host memory utilization target. Then, the dominant constraint (i.e. the constraint with the largest impact on UX) is considered in the determination of the achievable quality and frame rate. Compliance with the target network bandwidth is evaluated by predicting resource utilization and the resultant size of encoded data for the changed region, for example based on historic bits-per-pixel information for similar image content type encoded at the previously set target quality for the same region or present quality target for a neighboring region, suitably scaled based on the number of pixels in the changed region.

If the predicted size of encoded data is within the target network bandwidth, the achievable quality may be set to a higher value than that used in the prediction. One approach to enabling a UX bias involves demarcating "minimum initial quality" and "maximum initial quality" values within the quality range supported by encoder 140 which sets lower and upper bounds on the achievable quality. At reduced bandwidth availability, the target network bandwidth is maintained by maintaining the minimum initial quality" at a compromised frame rate compared to the desired frame rate determined at step 520. At high bandwidth availability, the target network bandwidth is maintained by using the maximum initial quality as the achievable quality and favoring increased frame rate until the frame rate itself reaches an upper bound. Image quality may be increased above the maximum initial quality using excess available bandwidth or processing resources in conjunction with well-known image improvement techniques such as progressive image refinement while compressing decimated regions of an image. If the target network bandwidth corresponds with an achievable image quality that lies between the maximum and minimum initial quality values, the balance between quality and frame rate is accomplished using a well-known image quality vs. frame rate relationship curve in conjunction with UX bias parameter 242 which, in an embodiment, comprises a value on a trade-off scale between maximum image quality and maximum frame rate which delivers an image quality between specified minimum and maximum values at a frame rate between specified minimum and maximum values. For example, given a set of UX bias values b (e.g. values between 0 and 1), $q_b = b \times q_a$ where, a) $q_a$ is the unbiased achievable image quality
b) $q_b$ is the biased achievable image quality
and the lowest achievable $q_b$ is limited according to the minimum initial quality value.

Compliance with the CPU targets is evaluated by predicting the resultant CPU processing cycles for the changed region, for example based on historic processing information for similar image content size and type. Similarly, compliance with the memory utilization targets is evaluated by predicting the resultant memory utilization for the changed region.

Process 500 proceeds to step 550 ("Determine Gap") where the gap between the current image quality and achievable image quality is determined. If the gap between is large (e.g. by comparing the required number of quality increments to a predetermined threshold), process 500 proceeds to step 560 ("Course Adjust") where a course adjustment is made to the target quality by using the achievable quality value as the new target quality. If the gap between the current image quality and achievable image quality is small, process 500 proceeds to step 570 ("Fine Adjust") where an incremental adjustment is made to the current target image quality. Process 500 proceeds to optional step 580 ("Estimate Resource Usage and Re-adjust") where the resource usage using the new target quality value determined at step 560 or step 570 is estimated. If a resource is determined to be over- or under-utilized, the target image quality is tuned accordingly. In an embodiment, a hysteresis is applied to the new target image quality for system stability purposes. For example, the new target image quality is fed into a low pass filter, the output of which is used as a dampened new target image quality value. Process 500 then exits from step 580. According to some embodiments, the target image quality is adjusted by determining a dampened quality value determined respective of a previous image quality of a previous frame and an un-dampened image quality of a current frame.

Figure 6:
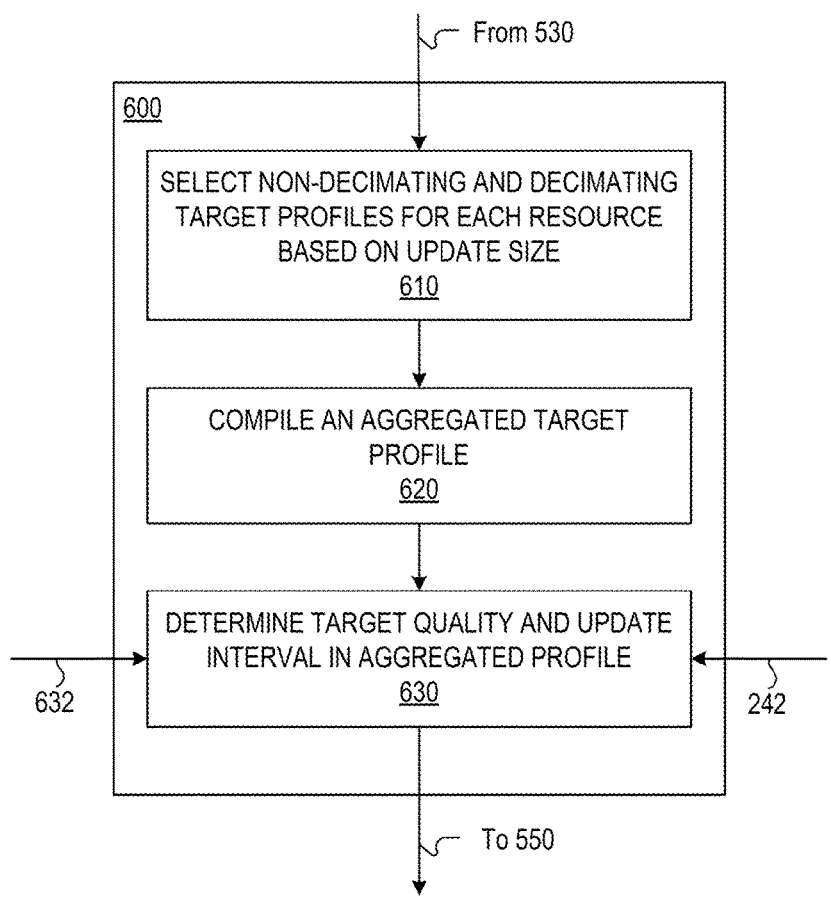
FIG. 6 illustrates a process for adjusting quality and desired frame rate.

FIG. 6 is an illustration of a process 600 which is an embodiment of step 542. Process 600 starts at step 610 ("Select Target Profiles for Each Resource Based on Update Size"). In an embodiment, non-decimating and decimating target profiles from the sets generated at step 210 (and updated at step 220) are selected for host CPU, client CPU and network resources that match the host CPU constraint, client CPU constraint and network bandwidth constraint of system 100 in view of the size of update determined at step 510. FIG. 7 illustrates a set of non-decimating and decimating network resource target profiles and one is selected from each of plot 710 and plot 750 based on the image update size. FIG. 8 illustrates a set of non-decimating and decimating CPU resource target profiles, and one is selected from each of plot 810 and plot 850 based on the image update size. Similarly, in some embodiments, non-decimating and decimating target profiles are selected for GPU resources or memory resources.

Figure 10:
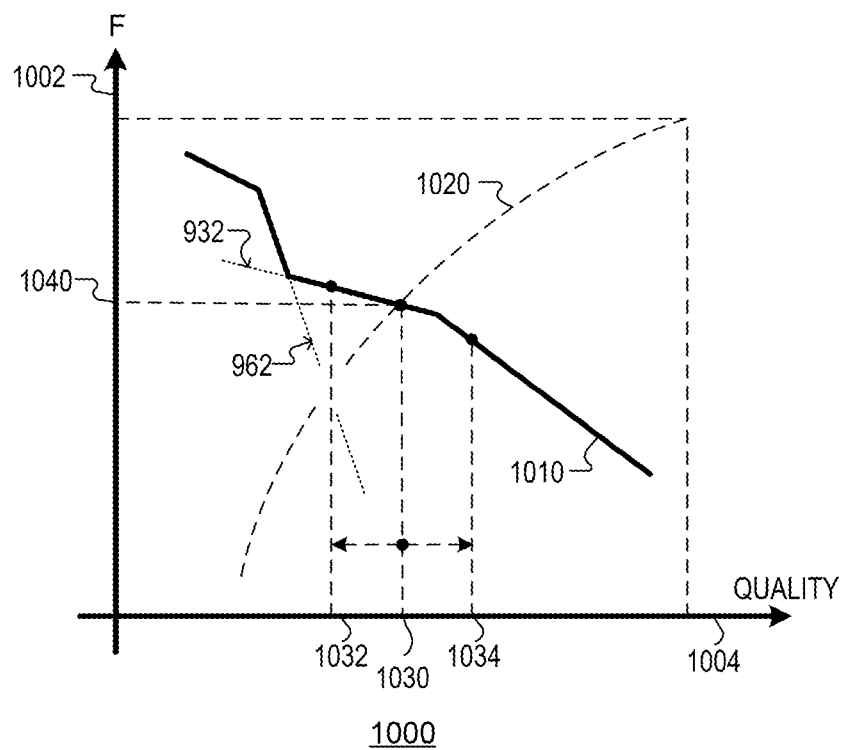
FIG. 10 illustrates an aggregated target profile used to determine a nominal target quality value or a target quality value biased from the nominal value by user experience preferences.

Process 600 proceeds to step 620 ("Compile an Aggregated Target Profile") in which an aggregated target profile is created from the profiles selected at step 610. FIG. 9 illustrates a series of steps for compiling the various resources for each of the non-decimating and decimating cases. FIG. 10 illustrates a further aggregation of the compiled non-decimating and decimating target profiles.

Process 600 proceeds to step 630 ("Determine Target Quality and Update Interval in Aggregated Profile") in which an optimal target quality value is selected from the aggregated target profile and biased by the UX bias parameter 242 to arrive at an updated target quality value and corresponding new update interval with the effect that the quantization value (selected for step 460) is weighted by the UX bias. FIG. 9 illustrates steps for determining an optimal target quality value using an aggregated resource target profile. In some embodiments, the optimal target quality value is biased by both the UX bias parameter 242 and the native frame rate 632 associated with the source image 150. The update interval may be biased by a source image frame rate (e.g. a video image source) which is higher than an imposed desired frame rate determined at step 520. In an exemplary embodiment, the optimal target quality value is derived from the UX bias parameter when the update interval is within 50% of the source interval but biased in favor of frame rate over image quality when the update interval less than 50% of the source interval.

FIG. 7 is a graphical representation of a set of non-decimating network resource target profiles plot 710 and a set of decimating network resource target profiles plot 750. Target profiles plot 710 plots the frequency 712 against the target quality 714 for representative profiles 720, 721, 722, 723, 724 and 725, each representing a constant available bandwidth profile, in order of decreasing available bandwidth. The frequency axis 712 expresses the inverse of the update interval, for example 1/16.6 ms for a 60 frame per second (fps) encoder output rate. In an embodiment, profiles 720-725 are expressed in terms of a ratio of network bandwidth limit (e.g. a bits per second limitation) divided by the size of the image update (i.e. a number of pixels value). For example, profile 723 might represent (1 Mbps)/(1 megapixels)=1. Profiles 721 and 720 represent increased ratios (e.g. 2 and 3 respectively) and profiles 723, 724 and 725 represent decreased ratios (e.g. 0.8, 0.6 and 0.4 respectively). Plot 710 is bounded by frequency 716 related to the desired frame rate determined at step 520 and maximum allowed quality 717 also determined at step 520. Threshold quality line 718 indicates the quality at which encoder 140 transitions between a non-decimating mode (i.e. at quality values above threshold 718) and a decimating mode (i.e. at quality values below threshold 718). Constant frequency line 740 represents a desired lower frequency limit for video content, below which the video content is no longer perceived as video. Line 740 may be subjectively determined or biased according to user preferences. In an exemplary embodiment, line 740 is preset to eight frames per second.

Similarly, the target profiles plot 750 plots the frequency 752 against the target quality 754 for representative profiles 760, 761 and 762 which correspond with the target profiles 723, 724 and 725 respectively but provide higher frequency gain at the expense of image quality as a consequence of the decimation step 440. The frequency axis 752 corresponds with the frequency axis 712 and the quality axis 754 corresponds with the quality axis 714. Plot 750 is also bounded by frequency 716 determined at step 520 and the maximum allowed quality when decimation is invoked i.e. the quality threshold 758 corresponds with the quality threshold 718.

FIG. 8 is a graphical representation of a set of non-decimating CPU resource target profiles plot 810 and a set of decimating CPU resource target profiles plot 850.

Target profiles 810 which plot the frequency 812 against the target quality 814 for representative profiles 820, 821, 822 and 823, each representing a constant available CPU resource profile, in order of decreasing available CPU resource. In an embodiment, profiles 820-823 are expressed in terms of CPU processing limit (e.g. a pixels per second limitation, typically expressed in millions of pixels per second [mpps]) divided by the size of the image update (i.e. a number of pixels value). For example, profile 821 might represent (30 mpps)/(1 million pixels)=30 frame updates per second, each comprising 1 million pixels. Profile 820 represents a higher CPU processing limit (e.g. 60 frame updates per second) while profiles 822 and profile 823 represent reduced CPU processing limits (e.g. 20 and 10 frame updates per second, respectively).

Similarly, the target profiles plot 850 plots the frequency 852 against the target quality 854 for representative profiles 860, 861, 862 and 863 which correspond with the target profiles 820, 821, 822 and 823 respectively but provide higher frequency gain at the expense of image quality as a consequence of the decimation step 440.

In some embodiments, plots 810 and 850 further comprise additional curves indicating CPU resource limitations for both single threaded and multi-threaded implementations of encoder 140 which enables real-time profile switching and resultant user experience adjustment based on thread utilization of encoder 140. In an embodiment, plots 810 and 850 are adjusted by host and client power consumption factors associated with host and client power consumption profiles.

FIG. 9 is an illustration of a set of steps 900 used to compile an aggregated non-decimating target profile shown in plot 930 and an aggregated decimating target profile shown in plot 960. For the non-decimation case, the target profile 912 on target network bandwidth plot 910 is selected at step 520 of process 500 shown in FIG. 5. Target profile 912 represents the target profile from plot 710 matching the network bandwidth constraint of system 100 (in view of the size of update determined at step 510 of FIG. 5). Additionally, the target profile 922 on the target CPU plot 920 is selected at step 520. Target profile 922 represents the target profile from plot 810 matching a CPU bandwidth constraint of system 100 (e.g. target profile 922 represents a client CPU constraint). The target profile 932 on the non-decimating accumulated target profile 930 represents the aggregated least of profiles 912 and 922.

For the decimation case, the target profile 942 on target network bandwidth plot 940 is selected at step 520 which represents the target profile from plot 750 corresponding with the non-decimation plot 910. Additionally, the target profile 952 on the target CPU plot 950 is selected at step 520 which represents the target profile from plot 850 corresponding with the non-decimation plot 920. The target profile 962 on the decimating accumulated target plot 960 represents the aggregated least of profiles 942 and 952.

It should be noted that plots 930 and 960 each comprise the aggregation of just two target profiles for clarity of explanation. In an embodiment, aggregated profiles 932 and 962 are further shaped by additional aggregation of host CPU target profiles, power consumption target profiles, memory consumption target profiles and GPU utilization target profiles, any of which may be weighted by short term objectives such as the application window being out of focus or user presence status information received from the client.

FIG. 10 is an illustration of an aggregated target profile plot 1000 used to determine a nominal target image quality value 1030 or a target quality value biased from the nominal value by user experience preferences. Aggregated target profile 1010 comprises the highest quality per frequency value from the aggregation of profiles 932 and 962. Nominal target quality value 1030 comprises the intersection between profile 1010 and conventional video UX profile 1020. Video UX profile 1020 plots a well-known relationship between frame rate and quality as determined by mean opinion scores (i.e. users generally favor frame rate over image quality under severe constraint where both values are low. Once frame rate achieves a subjective threshold, image quality is increasingly desired over frame rate). The nominal target quality value 1030 is biased in favor of frame rate over quality (e.g. target quality value 1030) or biased in favor of quality over frame rate (e.g. target quality value 1034). The magnitude of the bias is dependent on i) user preferences (e.g. one or more variable parameters for encoder 140 such as a quality versus frame rate preference setting, and/or max/min settings for quality and or frame rate) or ii) administrator settings (e.g. a power plan or CPU allocation plan) or related to the magnitude of the difference between native frame rate 632 and the frame rate 1040 corresponding with nominal target quality 1030. In an embodiment in which biasing is automated, the UX is biased in favor of frame rate when the magnitude of the difference is high but biased in favor of quality when the magnitude is low.

Figure 11:
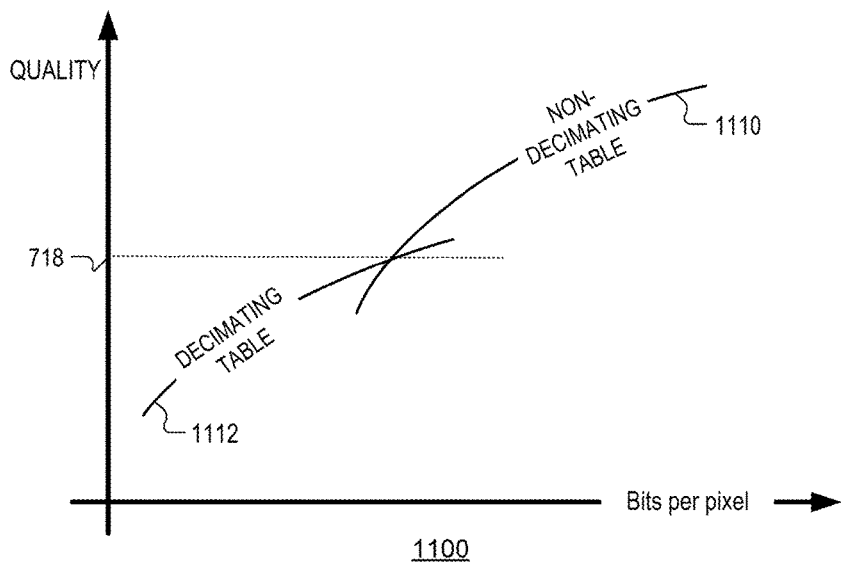
FIG. 11 illustrates non-decimation and decimation quantization curves that overlap at a quality threshold.

FIG. 11 is a graphical representation of non-decimation and decimation quantization plot 1100 comprising curves that overlap at the quality threshold 718. In an embodiment, the encoder 140 uses curve 1110 (associated with a non-decimated quantization table 462) to reduce the target quality in the direction of threshold 718. When threshold 718 is reached, encoder 140 switches to curve 1112 (associated with a decimation quantization table 464) to further decrement the quality and frame rate. Hysteresis is introduced by following a different set of curves upwards as the target quality value is incremented.

Figure 12:
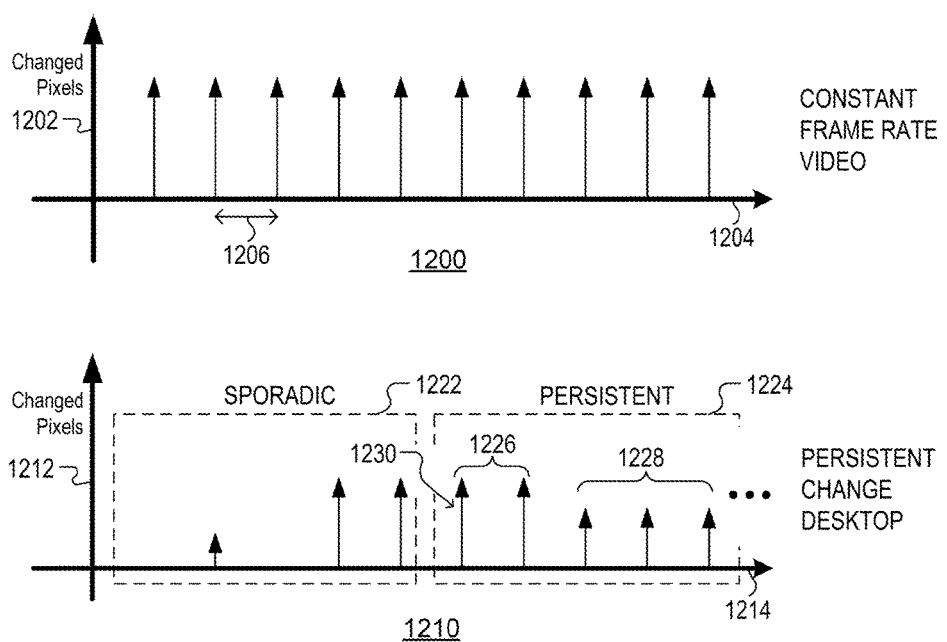
FIG. 12 illustrates graphs comparing the difference in timing and number of changed pixels between a traditional video source image and a desktop display image.

FIG. 12 is an illustration of graphs comparing the difference in timing and number of changed pixels between a traditional video source image and a desktop display image. Video stream trace 1200 plots the number of changed pixels 1202 against time for a video source image. All updates to the source image are at evenly spaced time intervals 1206 (e.g. 41.6 ms for a 24 fps video source) and all updates comprise the same number of pixel updates (e.g. 921,600 pixels updated for a 720p video format). Such a video stream has a relatively consistent host and client CPU resource loading in addition to a relatively consistent network bandwidth demand corresponding with each video quality value.

Desktop image update trace 1210 plots the number of changed pixels 1212 against time for updates to source image 150 for a computer desktop display image. During some periods (e.g. sporadic period 1222) change frequency is dependent on user activity, i.e., the source image 150 may not be updated during periods of inactivity. During other periods (e.g. persistent change period 1224), updates to source image 150 are periodic due to the period nature of particular source content (e.g. when video content is being decoded to source image 150). Unlike video stream trace 1200, the number of changed pixels varies, for example during period 1226 an entire video image may be visible on a desktop but during period 1228, the video image may be partially obscured by other content such as another application window comprising non-changing content. Step 420 monitors the number of changes over a determined period of time and once a predetermined threshold is reached, further updates (e.g. update 1230 onwards) are characterized as 'persistently changing' until a period of inactivity is detected. Unlike a video stream, demands on host and client CPU resources in addition to network bandwidth demands are highly variable.

While the foregoing is directed to embodiments of the present invention, other and further embodiments of the invention may be devised without departing from the basic scope thereof, and the scope thereof is determined by the claims that follow.

The invention claimed is:

1. A method for transmitting a desktop display comprising:
   classifying a first region of the desktop display as persistently changed and a second region of the desktop display as sporadically changed, wherein the first region is selectively chosen from a sequence of frames of the desktop display to maintain a specified central processing unit (CPU) resource utilization target;

adjusting, in relation to a user experience (UX) bias and a resource constraint, a target image quality for the first region;

decimating the first region in accordance with a spatial decimation factor to generate a first decimated region;

compressing the first decimated region at the target image quality and compressing the second region to generate a plurality of compressed regions; and transmitting the plurality of compressed regions to a client via an IP network.

2. The method of claim 1, wherein the spatial decimation factor is at least four to one.

3. The method of claim 1, wherein the target image quality is further specified by a quantization value weighted by the UX bias.

4. The method of claim 1, wherein the UX bias comprises a value on a trade-off scale between maximum image quality and maximum frame rate.

5. The method of claim 1, wherein the UX bias is adjusted in response to input received from the client.

6. The method of claim 1, wherein the resource constraint is adjusted for resource utilization requirements of the second region.

7. The method of claim 1, wherein decimating comprises, representing a block of pixels as a single pixel, the single pixel comprising a gamma-corrected average of the block of pixels.

8. The method of claim 1, wherein compressing further comprises:

transforming the decimated first region and the second region using a block size common to the decimated first region and the second region.

9. The method of claim 1, wherein compressing the second region comprises:

generating a progressive refinement of a previously changed block of pixels.

10. The method of claim 1, further comprising:

demarcating, prior to decimating, a zone in the first region which is excluded from decimating.

11. The method of claim 1, wherein the resource constraint comprises the most significant of i) a bandwidth constraint of the IP network, ii) a client processor utilization target and iii) a host processor utilization target.

12. The method of claim 11, wherein the client processor utilization target is reduced if the first region is determined to be out of focus.

13. The method of claim 11, wherein the host processor utilization target is reduced if the first region is determined to be out of focus.

14. The method of claim 11, wherein the client processor utilization target is adjusted according to power consumption requirements of the client.

15. The method of claim 1 further comprising, prior to decimating and compressing:

predicting resource utilization based on the target image quality and readjusting the target image quality in relation to at least a second resource constraint and the UX bias.

16. The method of claim 15, wherein adjusting the target image quality comprises:

determining a dampened quality value determined respective of a previous image quality of a previous frame and an un-dampened image quality of a current frame being processed for decimation and compression.

17. An apparatus for transmitting a desktop display comprising:

a host processor; and memory, storing thereon computer executable code for a resource aware encoder that when executed by the host processor performs a method comprising:

classifying a first region of the desktop display as persistently changed and a second region of the desktop display as sporadically changed, wherein the first region is selectively chosen from a sequence of frames of the desktop display to maintain a specified central processing unit (CPU) resource utilization target;

adjusting, in relation to a user experience (UX) bias and a resource constraint, a target image quality for the first region;

decimating the first region in accordance with a spatial decimation factor to generate a first decimated region; and compressing the first decimated region at the target image quality and compressing the second region to generate a plurality of compressed regions, wherein the host processor transmits the plurality of compressed regions to a client via an IP network.

18. The apparatus of claim 17, wherein the resource aware encoder further:

demarcates, prior to decimating, a zone in the first region which is excluded from decimating.

19. The apparatus of claim 17 wherein the resource aware encoder, prior to decimating and compressing:

predicts resource utilization based on the target image quality and readjusting the target image quality in relation to at least a second resource constraint and the UX bias.

20. A method for transmitting a desktop display comprising:

classifying a first region of the desktop display as persistently changed and a second region of the desktop display as sporadically changed;

adjusting, in relation to a user experience (UX) bias and a resource constraint, a target image quality for the first region, wherein the resource constraint comprises one of i) a bandwidth constraint of an IP network, ii) a client processor utilization target and iii) a host processor utilization target, and wherein the client processor utilization target is reduced if the first region is determined to be out of focus or adjusted according to power consumption requirements of a client, and the host processor utilization target is reduced if the first region is determined to be out of focus;

decimating the first region in accordance with a spatial decimation factor to generate a first decimated region;

compressing the first decimated region at the target image quality and compressing the second region to generate a plurality of compressed regions; and transmitting the plurality of compressed regions to the client via an IP network.

* * * * *